Figure 1:
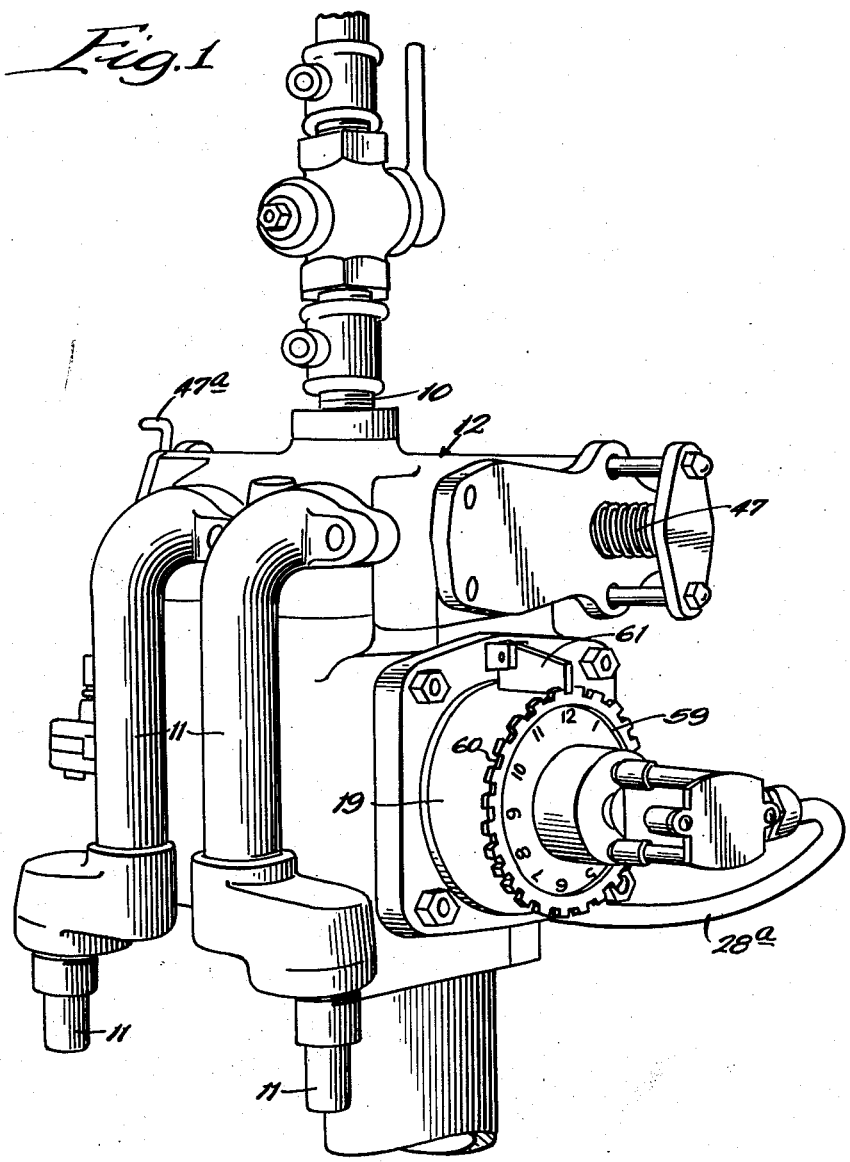

March 23, 1954     B. S. HARRINGTON     2,673,012
FILLING MACHINE

Filed Feb. 23, 1951     2 Sheets-Sheet 1

Patented Mar. 23, 1954

2,673,012

UNITED STATES PATENT OFFICE 2,673,012

FILLING MACHINE

Bertie S. Harrington, Chicago, Ill., assignor to Armour and Company, Chicago, Ill., a corporation of Illinois Application February 23, 1951, Serial No. 212,439

10 Claims. (Cl. 222—250)

This invention relates to a filling machine, and it is particularly useful in measuring accurately and quickly quantities of material and discharging the same separately for filling containers. While applicable to other uses, the machine is especially useful in the measuring and dispensing of semi-solid materials, such as cheese, mayonnaise, lard, salad dressings, margarine, spreads, and a variety of other fluid or semi-solid products.

This application constitutes a continuation-in-part of my co-pending application, Serial No. 158,306, filed April 26, 1950. Certain common subject matter disclosed in application Serial No. 158,306, and claimed in the present application, is also disclosed in my application Serial No. 61,626, filed November 23, 1948, which was co-pending with application Serial No. 158,306 and has now issued as United States Patent No. 2,525,295.

An object of the invention is to provide a machine in which a product is measured with extreme accuracy and discharged quickly through separate outlets for filling containers, the material being passed into the measuring chamber under pressure. A further object is to provide in such a structure means for drawing any excess portion of the material being discharged and which collects upon the discharge outlet, back into the conduit after the filling operation to prevent drippage, etc., and to insure an accurate discharge of the measured material. A further object is to provide a structure in which fluid pressure is employed for controlling the flow of semi-solid material, etc. into the measuring cylinder and while at the same time providing control mechanism which anticipates the completion of the stroke of the measuring piston for reversing the fluid flow in the operation, with the result that the filling machine is kept substantially in continuous operation, with no substantial time intervals between strokes. Yet another object is to provide in such a structure control means within the cylinder and actuated by the measuring piston itself, the travel of such control means being very limited so that foreign material is not carried into the cylinder during the measuring operations. A further object is to provide an integrated machine in which the mechanism operates in timed relation for feeding semi-solid material under pressure into a measuring cylinder equipped with a floating piston, together with valve means for controlling the inflow and outflow of material from the cylinder, the valve means being set into operation before the piston reaches the end of its stroke, means being also provided for the control of excess material about the discharge aperture.

Yet another object is to provide, in combination with measuring means for supplying a semi-solid or fluid material to containers, valve means for controlling the flow of the material to and from the measuring means and thence to discharge conduits, the valve structure providing also means for creating a suction at the end of each filling step and sucking back material at the end of the conduit or nozzle.

A still further object is to provide in such a structure a measuring cylinder with a floating piston therein, a valve mechanism for alternately directing the product measured into one end of the cylinder and out through a filling nozzle on the other end, while providing push rods through the cylinder head which operate micro-electric switches adjustable to anticipate the piston reaching the end of its stroke so as to advance or start the exchange of ports in a solenoid-operated air valve, the power from which alternates the valve mechanism changing the flow of product into and out of the measuring cylinder. Other specific objects and advantages will appear as the specification proceeds.

The invention is shown in an illustrative embodiment by the accompanying drawing, in which—

Figure 2:
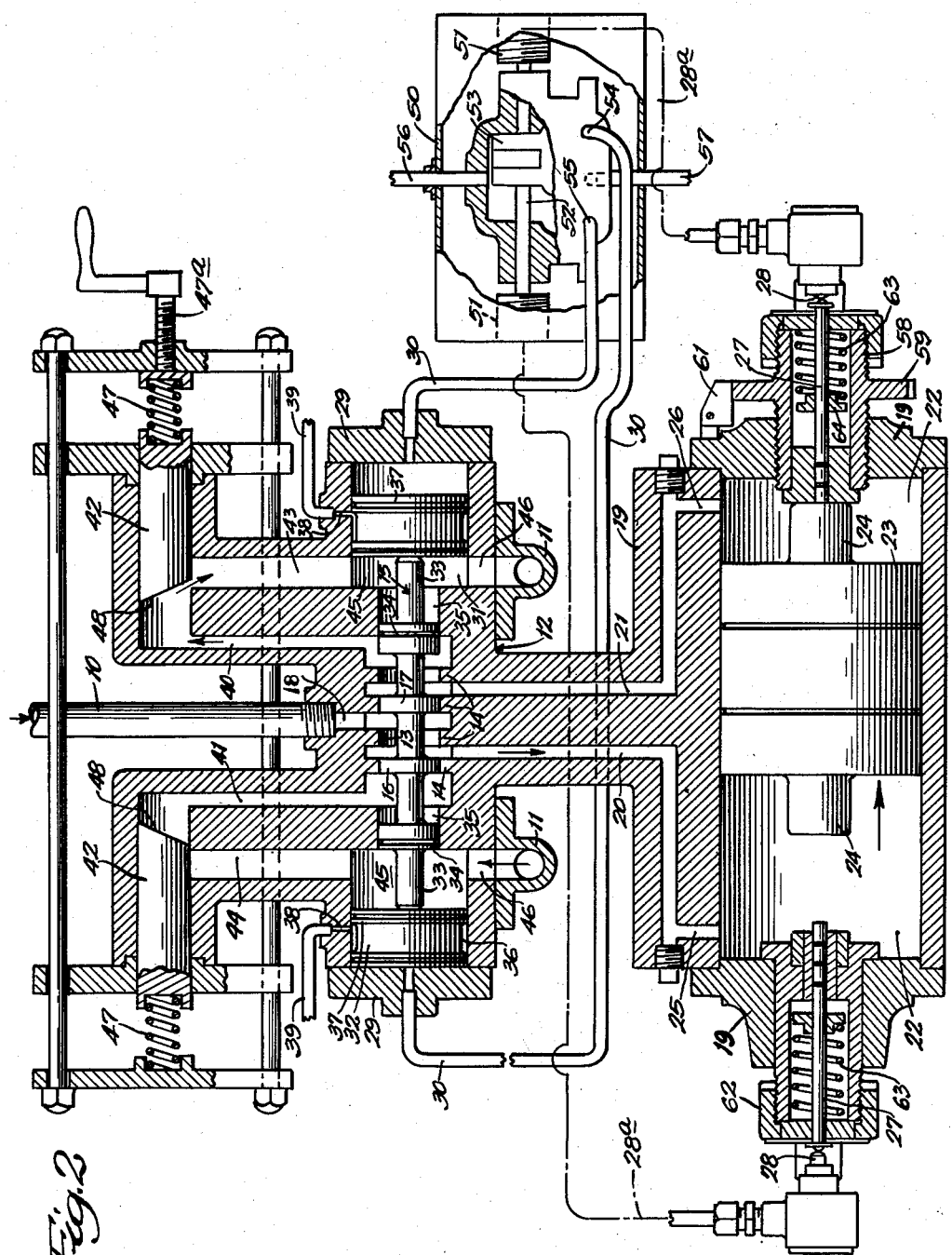

Figure 1 is a perspective view of apparatus showing my invention; and Fig. 2, a broken vertical sectional view of a structure embodying my invention.

In the illustration given, and more particularly as shown in Fig. 2, 10 designates the incoming pipe or conduit leading from a pump or other source of pressure. The material may consist of lard, molten cheese or other fluid, or semi-solid types of materials which are to be discharged into containers. The apparatus illustrated is adapted for the filling of containers alternately, the containers being carried below the filling nozzles 11 on separate conveyor tracks (not shown).

I provide a valve housing 12, in which there is centrally provided a valve chamber 13 equipped with sealing lands 14. A spool valve 15 is mounted for reciprocal movement and is equipped with valve discs 16 and 17 adapted to alternately making sealing contact with the spaced lands 14 so as to close and open their passages. The incoming conduit 10 communicates centrally with the chamber 13 through a passage 18, as shown more clearly in Fig. 2.

Below the valve housing 12 is a measuring cylinder housing 19, and the two housings are connected so as to provide the passages 20 and 21. The housing 19 provides a cylinder chamber 22 in which is mounted a floating piston 23 having projections 24 at the ends thereof.

The passage 20 communicates with a port 25 at one end of the cylinder chamber 22, while the passage 21 communicates with a port 26 at the other end of the chamber 22. Thus when fluid material is supplied under pressure at one end of the piston 23, it causes the piston to move in the opposite direction and to force fluid material out of the other end of the chamber, as will be described more fully hereinafter.

Each end of the cylinder housing 19 is provided with a spring-urged plunger 27 adapted to actuate a contact 28 to make or break an electrical circuit, as desired. The electrical circuit, in turn is equipped with solenoids or other means for actuating an air valve for the supplying of air for the actuation of the spool valve 15, as will be later described. The electric circuit and valve mechanism is shown in detail in my co-pending application, Serial No. 35,193, filed June 25, 1948, now Patent No. 2,620,960, dated December 9, 1950.

Any means may be employed for the actuation of the spool valve 15. In the specific illustration given in Figs. 1 and 2, the housing 12 is equipped at each end with an end plate 29 which is apertured to receive a compressed air tube 30. The housing also provides an air chamber 31 in which there is mounted a floating piston 32. The piston 32 is adapted to engage on its inner side an extension 33 of the spool valve 15. The stem extension 33 is preferably provided with a bearing or sealing ring 34 which is received within a reduced recess 35 provided by the housing.

The pistons 32 may be of any desired construction. I prefer to provide each piston centrally with an annular recess 36 and on each side of the recess I prefer to employ sealing rings or gaskets 37 formed of resilient material such as rubber, etc. It is important that air not come in contact with the lard which is being dispensed, and the sealing ring 37 is effective for preventing the flow of air into the annular recess 36. The sealing ring 37 on the opposite side is also effective in preventing the flow of lard into the annular recess. In order to take care of any possible leakage of either of the materials into the recess, I provide an outlet port 38 through the housing and communicating with the annular recess 36. A conduit 39 communicates with the passage 38 for the drawing off of any such material that may leak into the annular recess 36.

The passages connecting the inlet pipe 10 with the ends of the measuring cylinder 22 have already been described. When the material is discharged from the measuring cylinder 22, it flows back through the same passage 20 or 21 by which it entered the cylinder, and the valve housing 12 provides separate discharge passages through which the material may be discharged. The passage 21, when material is being discharged therefrom, will be connected by the valve to the outlet passage 40, while the passage 20 will be connected with the outlet passage 41. The outlet passage 40 communicates past a control block 42 with a discharge conduit 43, while the passage 41 communicates through a similar control block 42 with a discharge passage 44.

The valve housing provides on the inner side of each of the pistons 32 a suction chamber 45. At the lower end of the suction chamber 45 is a discharge passage 46 communicating with the chamber 45 and with the filling nozzle or conduit end 11. Thus we have a discharge conduit leading from the outlet port of each measuring cylinder to the nozzles 11 and the suction chambers 45 are interposed in these discharge conduits. When the valve parts and the piston 32, which forms, in effect, a part of the valve, are in the position shown at the right hand side of Fig. 2, the valve chamber 31 is in a contracted position and is of reduced size or capacity, while when the parts are in the position shown on the left hand side of Fig. 2, the chamber 45 is enlarged or in its expanded condition and such expansion creates a suction upon the discharge nozzle therebelow, tending to suck back into the conduit material clinging to the end of the nozzle.

The control blocks 42 may be of any suitable type or construction. In the illustration given, the blocks 42 are each urged inwardly by a spring 47 and each is provided with a cut-away portion 48 at its inner end, so that when the material forces the block outwardly, there is provided an orifice through which the lard, etc. is sprayed into the passage 43 or 44. Such spraying or atomization redistributes air through the lard and gives the proper air content for the lard, thus increasing its whiteness. The atomizer blocks 42 are not necessary and may, if desired, be omitted, any suitable means being provided for closing the outlet passage or the outer end of the valve chamber 45. In operation, the atomizer blocks 42 form a seal for the outer end of passage 43 or 44 when the material is not being discharged into these passages. A handle 47a is provided for adjusting the tension on spring 47.

The compressed air tube 30 from each end of the housing leads to a valve 50 which is provided with two solenoids 51 receiving opposite ends of a shaft 52. A valve 53 is carried by the shaft 52 and controlling the ports which will now be described. The port 54 communicates through pipe 30 with one end of the housing, while the port 55 communicates through pipe 30 with the other end of the casing, as shown more clearly in Fig. 2. Fluid pressure or compressed air is supplied from a compressor or other source through the pipe 56. A vent pipe 57 communicates with the atmosphere below the machine. The contact 28 at one end of the housing closes a switch in a circuit 28a with one of the solenoids 51, while the contact 28 at the other end of the housing closes a switch in a circuit with the other solenoid 51, whereby upon the movement of the push rod 27 at one end of the housing in one direction, the solenoid will be energized to shift the valve 53, while when the push rod 27 is moved outwardly at the other end of the housing, the other solenoid will be energized.

Heavy pressures are encountered in controlling the flow of semi-solid material through the apparatus and it is of great importance to employ air pressure in the operation of the valves which control such flow. However, air pressure mechanisms require valves which function rather slowly and the resulting mechanism is found to be too slow for the efficient filling of containers. To meet this difficulty while at the same time enabling the desired air pressure to be employed for the operation of such valves in controlling the flow of such heavy or semi-solid materials through the machine, I have equipped the casing with the push rods 27 heretofore mentioned. By adjusting the position of the push rods so that they actuate the switches well before the piston reaches the end of its stroke, I find that the pauses between the working strokes can be substantially eliminated. Further, I provide means for adjusting the push rods to permit the desired timing described above. In the structure shown, I provide a threaded member 58 equipped with a wheel handle 59 having notches 60 therein receiving the pivoted locking member 61. By rotating the member 59, the rod 27 may be moved longitudinally to provide the desired adjustment. Similarly, the rod 27 at the end of the housing may be adjusted longitudinally by the threaded support sleeve 62.

I provide springs 63 which bear inwardly against collars 64 fixed to the push rods 27 so as to urge the push rods 27 normally inwardly toward the piston 23.

Operation

In the operation of the machine, lard or other material is fed through pipe 10 under pressure. Air pressure is supplied through pipe 30 to one end of the valve housing. In Fig. 2, the pressure is shown applied to the right hand side of the housing and the piston 32 at this end is moved to the left, forcing the valve 15 and the opposite piston 32 to the left. This causes the lard to flow through passage 29, as indicated by the arrow, into the chamber on the left hand side of piston 23. Piston 23 thus is moved to the right and forces material upwardly through passage 21, the valve chamber 13, and out through passage 40, past the block 42 and into the discharge passage 43. The material continues to flow through the chamber 45, which is of reduced capacity, and out through the discharge nozzle 11. At the conclusion of the filling step, the piston 23 has, through its extension 24, moved the plunger 27 outwardly to operate the contact 28, thus causing the valve mechanism to reverse the air flow and the piston 32 on the left hand side of the housing is moved to the right, causing the chamber 45 on the right hand side to enlarge and create a suction on the discharge nozzle, thus drawing the material back into the nozzle and valve chamber. In the next filling operation, this material which is drawn back into the valve chamber 45, will be discharged into the container below the nozzle.

The chamber 45 at the left hand side of the valve housing is shown in its enlarged condition and illustrates the size of the chamber immediately after the filling operation so that suction is being established upon the nozzle. It will be noted that the block 42 seals the outer end of the discharge passage and the sudden enlargement of chamber 45 therebelow creates the suction upon the nozzle. However, even if block 42 were not used, the spool valve 15 would close passage 41.

In each reciprocation of the measuring piston 23, the extension 24 of the piston engages a push rod 27, as indicated in Fig. 2, closing the switch associated with contact 28 and the circuit 28a. The solenoid included in such circuit is thereby energized and the valve rod or shaft 52 is shifted to bring the compressed air blowing inwardly through pipe 56 into engagement with the port communicating therewith through the valve. Similarly, when the piston 23 moves to the other end of the cylinder, it presses the push rod 23 outwardly to bring contact 28 into engagement with switch or closing circuit 28a leading to the other solenoid, and this brings about a reversal of movement of the valve. In each operation, the air is exhausted through the pipe 57.

By adjusting the supporting structure for the push rods 27 so that they are engaged by the piston well before the end of the stroke and the circuit 28a associated therewith is closed before the end of the stroke of the piston, the time lag which accompanies the use of valves employed in air pressure devices is overcome and by the time the piston actually reaches the end of its stroke, new material is already entering the cylinder at that side to cause it to start its movement in the other direction.

At the same time, while thus employing air pressure without loss of time between the strokes, there is no contamination of the material within the cylinders by the use of the push rods 27. These rods are so arranged as to move a very small distance, and no portion of the rod which extends beyond the housing ever enters the cylinder in which the material is measured.

The pressure for operating the valves 32 may be supplied by compressed air or any compressed gas or by liquids forced against the valve under pressure. Any suitable fluid pressure may be used. In the operation of the valve stem 52, I have shown in the drawing solenoids which receive the ends of the stem. It will be understood, however, that any type of electrically-operated valve may be employed.

The atomizer plugs or blocks 42 may be formed in any desired shape. I prefer, however, to form the blocks with diagonally-extending end surfaces 48. By forming the blocks 40 with the inclined ends 48, it is found that these blocks as they move from closed position to open position provide with the passages 44 and 45 a crescent-shaped opening which enlarges as the blocks are restricted. The resulting atomizing action of the blocks upon the fluid is found to be much improved with the larger volume of the material passing the central portion of the block edge and the thinner sheets of the material passing along the edges of each inclined surface 48. The inclined edge gives an oval or crescent-shaped opening which is found to be much more effective in the atomizing operation.

While in the foregoing specification I have set forth a specific structure in considerable detail for the purpose of illustrating one embodiment of the invention, it will be understood that such details of structure may be varied widely by those skilled in the art without departing from the spirit of my invention.

I claim:

1. In a filling machine, measuring cylinder having inlet and outlet ports and filling nozzles communicating with the outlet ports, fluid pressure means for alternately directly fluid material to be measured into opposite ends of said cylinder, a floating piston in said cylinder, push rods slideably mounted for limited movement in each end of said cylinder and projecting freely into the cylinder, electrically-operated means for controlling the flow of fluid to said fluid pressure means, circuits for said electrically-operated means, and circuit-makers in said circuits adapted to be actuated by engagement with the outer ends of said rods, each rod being arranged for engagement with said piston before the piston reaches the end of its stroke for actuating the circuit-maker to energize said electrically-operated means for changing the flow of the material into and out of said measuring cylinder.

2. In a filling machine, a measuring cylinder having ports at the ends thereof for the inflow and outflow of fluid material, pump means for forcing material alternately into opposite ends of said cylinder, fluid pressure devices for controlling the flow of said material into said cylinder, a floating piston in said cylinder movable in response to the inflow of material at one end thereof toward the opposite end of the cylinder for discharging the material in the opposite end of the cylinder, an electrically operated valve for controlling the flow of fluid alternately to said fluid pressure devices, electric circuits controlling the operation of said valve, push rods mounted for limited longitudinal movement in the ends of said measuring cylinder and projecting freely into the cylinder for engagement with said floating piston, and switches in said electric circuits mounted for engagement with said rods, whereby when a push rod is moved outwardly to close a switch, said electrically-operated valve is actuated before the piston reaches the end of its stroke for diverting fluid to one of the fluid pressure devices for the forcing of the material to be measured into the end of the cylinder being engaged by said floating piston.

3. In a filling machine, a measuring cylinder having at each end a port for the inflow and discharge of fluid material, a floating piston in said cylinder, pressure means for forcing material to be measured into one end of the cylinder to cause said floating piston to move the material in the other end of the cylinder out through the discharge end thereof, fluid-operated control means for directing said flow of material alternately into opposite ends of said cylinder, push rods slideably mounted in the ends of said measuring cylinder for limited movement therein, said push rods being engageable with said floating piston before the piston reaches the end of its stroke, an electrically-operated fluid valve for controlling the flow of fluid to said fluid-operated pressure means, and switches in circuit with said electrically-operated valve adapted to be closed by said push rods for the alternate operation of said fluid valve and the supply of fluid to said fluid-operated pressure means.

4. In a filling machine, a measuring cylinder, a pair of filling nozzles communicating with the cylinder at opposite ends thereof and adapted to discharge through separate outlets, said cylinder having ports at the ends thereof for the inflow and outflow of fluid material, a floating piston in said cylinder, valve mechanism for alternately directing said material to be measured into the ports for the inflow of material, fluid pressure mechanism for operating said valve mechanism, an electrically-operated valve for controlling the flow of fluid to said fluid pressure mechanism, contacts in the circuit of said electrically-operated valve, and longitudinally movable members mounted in the ends of said cylinder and having their outer ends adjacent said contacts for actuating the same, said longitudinal members being engaged by said piston when said piston approaches the end of its stroke, whereby said circuits are closed before said piston reaches the end of its stroke.

5. In a filling machine in which a measuring cylinder is provided with ports at the ends thereof for the inflow and outflow of fluid material and with filling nozzles adapted to receive the outflow of such material, means for forcing such material alternately into opposite ends of the cylinder, fluid-pressure operated valve means for controlling said flow of material to said ends of the cylinder, an electrically-operated valve controlling said fluid-pressure means, a circuit-equipped switch for each of said electrically-operated valves, and a push rod in each end of said measuring cylinder slideably mounted therein for limited longitudinal movement and adapted, when engaged by the piston moving toward the end of its stroke, to be moved longitudinally to close the switch of the adjacent circuit, whereby said fluid-operated mechanism is set into operation for directing material into the measuring cylinder at the end where the piston is reaching the end of its stroke.

6. In a filling machine, a measuring cylinder having ports at the ends thereof for the inflow and outflow of fluid material, a filling nozzle communicating with the ports for the outflow of material and adapted to discharge material into a container, valve mechanism for alternately directing material to be measured into one end of said cylinder through ports thereof for the inflow of material, a longitudinally-movable member mounted in each end of said cylinder, spring means urging said member toward said cylinder, a floating piston in said cylinder and equipped at each end with an extension engageable with the longitudinally-movable member, contacts engageable with the outer ends of said longitudinally-movable members, an electrically-operated valve adapted to be actuated by circuits in which said contacts are placed, and fluid-operated means controlled by said electrically-operated valve for actuating said valve mechanism, said longitudinally-movable members being mounted for engagement by the ends of said piston prior to the completion of the stroke of the piston.

7. In a filling machine, a measuring cylinder having ports at the ends thereof for the inflow and outflow of fluid material, filling nozzles communicating with ports of the cylinder for the outflow of said material, valve mechanism for alternately directing material to be measured into the ports for the inflow of material, a floating piston in said cylinder, short actuating rods slideably mounted in each end of said cylinder and projecting freely into the cylinder, fluid-operated means for actuating said valve mechanism, electrically-operated means for controlling the flow of fluid to said fluid-operated means, and switches in said electrically-operated means for engagement with the outer ends of said rods, said rods being pushed by said floating piston into engagement with switches to close the same before the piston reaches the end of its stroke.

8. In a filling machine, a measuring cylinder having ports at the ends thereof for the inflow and outflow of fluid material, filling nozzles communicating with ports of the cylinder for the outflow of material, valve mechanism for alternately directing material to be measured into the ports for the inflow of material, a floating piston in said cylinder, short actuating rods slideably mounted in each end of said cylinder and projecting freely into the cylinder, fluid-operated means for actuating said valve mechanism, electrically-operated means for controlling the flow of fluids to the fluid-operated means and actuated by said slideably-mounted rods, and an atomizing plug mounted for sliding movement across the inflow passage leading to the cylinder for constricting said passage, said plug being provided with an inclined outer face.

9. In a filling machine, a measuring cylinder having ports at the ends thereof for the inflow and outflow of fluid material, filling nozzles communicating with ports of the cylinder for the outflow of material, valve mechanism for alternately directing material to be measured into the ports for the inflow of material, a floating piston in said cylinder, short actuating rods slideably mounted in each end of said cylinder and projecting freely into the cylinder, fluid-operated means for actuating said valve mechanism, electrically-operated means for controlling the flow of fluid to the fluid-operated means and actuated by said slideably-mounted rods, and an atomizing plug mounted for sliding movement across the inflow passage leading to the cylinder for constricting said passage, said plug having its outer face inclined upwardly and inwardly whereby said block forms with a wall of said passage an oval-shaped opening.

10. In a filling machine, a measuring cylinder having ports at the ends thereof for the inflow and outflow of fluid material, filling nozzles communicating with ports of the cylinder for the outflow of said material, valve mechanism for alternately directing material to be measured into the ports for the inflow of material, said valve mechanism including an axially-shiftable spool valve with a piston at each end thereof for actuating said spool valve, a floating piston in said cylinder, actuating rods slidably mounted in each end of said cylinder and projecting freely into the cylinder, fluid-operated means for actuating said valve mechanism, said fluid-operated means including fluid connections to each end of said spool valve for alternately shifting said valve in each axial direction by fluid pressure selectively exerted against either one of said spool valve-actuating pistons, electrically-operated means for controlling the flow of fluid to said fluid-operated means, and switches in said electrically-operated means for engagement with the outer ends of said rods, said rods being pushed by said floating piston into engagement with switches to close the same before the piston reaches the end of its stroke.

BERTIE S. HARRINGTON.

References Cited in the file of this patent

UNITED STATES PATENTS

| Number | Name | Date |
| --- | --- | --- |
| 335,855 | Toole | Feb. 9, 1886 |
| 400,401 | Gutzkow | Mar. 28, 1889 |
| 1,393,856 | Upright | Oct. 18, 1921 |
| 1,804,772 | Hubbard | May 12, 1931 |
| 2,007,156 | Burrell | July 9, 1935 |
| 2,027,171 | Hillis | Jan. 7, 1936 |
| 2,150,760 | Cozzoli | Mar. 14, 1939 |
| 2,352,490 | Meyers | June 27, 1944 |
| 2,491,826 | Meyers et al. | Dec. 20, 1949 |
| 2,525,295 | Harrington | Oct. 10, 1950 |
| 2,567,052 | Carruthers | Sept. 4, 1951 |
| 2,620,960 | Harrington | Dec. 9, 1952 |

OTHER REFERENCES

Ansco-Harrington Filling Machines 708-A, described in drawing No. B-16,997, dated January 1, 1946. (Available in Div. 35, December 19 1951.)